(12) United States Patent
Lin et al.

(10) Patent No.: US 10,150,121 B2
(45) Date of Patent: Dec. 11, 2018

(54) COMBINED SHOWER

(71) Applicants: Hongxin Lin, Taizhou (CN); Guiyong He, Taizhou (CN)

(72) Inventors: Hongxin Lin, Taizhou (CN); Guiyong He, Taizhou (CN)

(73) Assignee: Zhejiang Huale Technology Co., Ltd., Taizhou (CN)

(*) Notice: Subject to any disclaimer, the term of this patent is extended or adjusted under 35 U.S.C. 154(b) by 0 days.

(21) Appl. No.: 15/337,031

(22) Filed: Oct. 28, 2016

(65) Prior Publication Data

US 2018/0104707 A1    Apr. 19, 2018

(30) Foreign Application Priority Data

Oct. 14, 2016  (CN) .......................... 2016 1 0897985

(51) Int. Cl.
*B05B 1/16*    (2006.01)
*B05B 15/62*   (2018.01)
*B05B 1/18*    (2006.01)
*E03C 1/02*    (2006.01)
*E03C 1/06*    (2006.01)
(Continued)

(52) U.S. Cl.
CPC .............. *B05B 1/1609* (2013.01); *B05B 1/16* (2013.01); *B05B 1/185* (2013.01); *B05B 15/62* (2018.02); *E03C 1/025* (2013.01); *E03C 1/0409* (2013.01); *E03C 1/06* (2013.01); *E03C 1/0408* (2013.01); *F16K 31/00* (2013.01)

(58) Field of Classification Search
CPC .... B05B 1/16; B05B 1/30; B05B 1/08; B05B 15/067; B05B 15/061; B05B 1/18; B05B 1/1609; B05B 1/185; A47K 3/28; E03C 1/0405; E03C 1/06; E03C 1/025

USPC .... 239/443, 446–447, 569, 581.1, 282, 565; 137/625–625.5; 4/605, 570
See application file for complete search history.

(56) References Cited

U.S. PATENT DOCUMENTS

2012/0325353 A1* 12/2012 Zhou ..................... B05B 1/1618
                                                       137/625
2013/0061966 A1*  3/2013 Zhou ...................... F16K 11/22
                                                       137/625.42
(Continued)

FOREIGN PATENT DOCUMENTS

CN    204220327 U    3/2015
CN    205217174 U    5/2016
CN    205217176 U    5/2016

*Primary Examiner* — Darren W Gorman
*Assistant Examiner* — Joel Zhou
(74) *Attorney, Agent, or Firm* — Minder Law Group; Willy H. Wong

(57) ABSTRACT

A combined shower comprising a top shower head and a handheld shower head, a first magnetic piece, an elastic piece and a sealing structure is inside an assembly hub of the top shower head. The first magnetic piece can move under the action of the elastic force from the elastic piece and then makes the sealing structure shut off the outflow cavity of the top shower head. The second magnetic piece is fixed on the handheld shower head and the second magnetic piece is arranged magnetically opposite and facing the first magnetic piece. Under the action of the attraction force from the second magnetic piece, the first magnetic piece can overcome the elastic force from the elastic piece, moves in the opposite direction, and makes the sealing structure connect the outflow cavity of the top shower head to the water inlet cavity.

14 Claims, 13 Drawing Sheets

(51) Int. Cl.
    E03C 1/04      (2006.01)
    F16K 31/00     (2006.01)

(56) References Cited

U.S. PATENT DOCUMENTS

2013/0320116 A1* 12/2013 Jonte ..................... B05B 1/18
                                                239/600
2015/0354192 A1* 12/2015 Hauth .................... E03D 9/085
                                                 4/448

* cited by examiner

COMBINED SHOWER

RELATED APPLICATIONS

This application claims benefit of Chinese Patent Application No. CN201610897985.1, filed Oct. 14, 2016.

The applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of shower apparatus, and particularly to a combined shower.

Related Art

A shower apparatus is used for having a shower, and is a common device in shower rooms. In the current marketplace, the common shower apparatus comprises a top shower head, a handheld shower head and a mounting seat for the inlet water. The mounting seat for the inlet water is fixed at a low position of the wall, and used to connect the inlet water pipes buried in the wall. The handheld shower head inserts into a fixation bracket and connects to the mounting seat for the inlet water through a soft hose. The top shower head is arranged above the user, and connects to the mounting seat for the inlet water through another pipeline. Inside the mounting seat for the inlet water, a switch valve core is designed to switch connection-selections between the top shower head and the handheld shower head. The user can switch to either the top shower head or the handheld shower head by operating the switch valve. However, the existing shower apparatus comprises the fixation bracket, the top shower head, and additional structures like the rigid pipelines connecting the mounting seat for the inlet water and etc. And the longitudinal length is too long, having the issue of occupying a big space.

One prior art shower apparatus combines a top shower head and a handheld shower head. The shower apparatus, a combination of a top shower head and a handheld shower head, comprises a top shower head having at least two spray patterns, as well as a handheld shower head. The top shower head has a first water circuit which connects to the water supply with compatible inlet pipe and water pressure. The top shower head also has the second water circuit, and the handheld shower head connects to the second water circuit through an external soft hose. There is a switch mechanism designed on the top shower head. The switch mechanism works in coordination with the inlet pipe, the first water circuit and the second water circuit, to achieve the water circuit switching. It can switch-select either water circuit to be connected to the water inlet pipe. The shower apparatus integrates the mounting seat for the inlet water to the fixation part of the top shower head, and attaches the handheld shower head to the surface of the fixation part of the top shower head with magnets. This removes the need of the fixation bracket used to fix the handheld shower head and the rigid pipelines connecting the top shower head to the mounting seat for the inlet water in the existing shower apparatuses, shortens the longitudinal length of the shower apparatus, and reduces the space occupation of the shower apparatus.

However, this shower apparatus integrates the whole structure around the top shower head. Because the top shower head needs to be arranged above the user, the position is high. When it is required to switch the water passage, the user needs to manually turn the knob designed on the fixation part of the top shower head. This requires a tall stature of the user, so it is quite difficult to use. In addition, the handheld shower head is attached to the surface of the fixation part of the top shower head only by the attraction of magnets. The fixation is not very stable and easy to fall off.

SUMMARY OF THE INVENTION

One objective of one embodiment of the present invention is to avoid the issues stated above in the prior art, and to provide a combined shower. The technical issue to be resolved is how to improve the convenience and stability of using the combined shower, while reducing the space occupation of the combined shower.

The object of one embodiment of the present invention can be achieved by the following technical proposal:

A combined shower comprises a top shower head, a handheld shower head and an assembly hub which has a water inlet. The assembly hub has a water inlet cavity inside that connects to the water inlet. The outflow cavity of the handheld shower head connects the water inlet cavity through the water hose. It is characterized in that:

Inside the assembly hub, there is also the first magnetic piece, an elastic piece and a sealing structure which can connect or block the outflow cavity of the top shower head and the water inlet cavity. The first magnetic piece can move under the action of the elastic force from the elastic piece and then makes the sealing structure shut off the outflow cavity of the top shower head. A holder cavity to hold the handheld shower head is designed in front of the assembly hub as well. The second magnetic piece is fixed on the handheld shower head and the second magnetic piece is arranged magnetically opposite and facing the first magnetic piece. Under the action of the attraction force from the second magnetic piece, the first magnetic piece can overcome the elastic force from the elastic piece, moves in the opposite direction, and makes the sealing structure connect the outflow cavity of the top shower head to the water inlet cavity.

When using one embodiment of the present combined shower, if the user needs to use the handheld shower head, they can hold the handle part of the handheld shower head, and take down the handheld shower head to wash the body. At this point, under the action of the elastic force from the elastic piece, the first magnetic piece inside the assembly hub moves and makes the sealing structure block the outflow cavity of the top shower head from the water inlet cavity. Hence, the top shower head does not spray water. When the top shower head needs to be used, the handheld shower head shall be put in the holder cavity in front of the assembly hub. Under the attraction force between the first magnetic piece and the second magnetic piece, the handheld shower head is fixed inside the holder cavity. Meanwhile, under the action of the attraction force from the second magnetic piece, the first magnetic piece overcomes the elastic force from the elastic piece, moves toward the front of the assembly hub, and makes the sealing structure connects the outflow cavity of the top shower head to the water inlet cavity, so the water flows into the outflow cavity of the top shower head and then sprays out from the spray panel of the top shower head. During the usage of one embodiment of the present combined shower, the connection control over the water passage is achieved by taking down or hanging up the handheld shower head, without manually turning the switch knob on the top shower head. It does not require a tall stature of the user and is easier to use. Meanwhile, with the attraction force between the first magnetic piece and the second magnetic piece, in coordination with the structure of the first holder cavity, it is more stable to hold the handheld shower head.

In the combined shower, there is also a water outlet cavity inside the assembly hub, and the water outlet cavity connects to the outflow cavity of the top shower head. The water outlet cavity also connects to the water inlet cavity through the water passage port, and the water passage port faces forward. The sealing structure is arranged near the water passage port, and can open or close the water passage port when driven by the first magnetic piece. The water passage port faces forward, so that the sealing structure, the first magnetic piece and the elastic piece are arranged near the front part of the assembly hub. The attraction force between the first magnetic piece and the second magnetic piece increases, without increasing the volumes of the first magnetic piece and the second magnetic piece. This makes the fixation of the handheld shower head more stable, and the movement of the first magnetic piece not easy to deviate, and ensures the working stability and reliability of the first magnetic piece and the sealing structure.

In the combined shower, the sealing structure comprises a pressure control cavity located in the front area of the water passage port, and a sealing washer arranged between the pressure control cavity and the water outlet cavity. Under the action of the water pressures from the front and rear sides, the sealing washer can move back and forth. When the sealing washer moves backward, it can press against the end of the water passage port and form a seal. Punctured on the sealing washer, there is a through hole which can connect the water inlet cavity to the pressure control cavity, and a pressure release passage which can connect the pressure control cavity to the water outlet cavity. The minimum cross-sectional area of the pressure release passage is greater than that of the through hole. Under the action of the elastic force from the elastic piece, the first magnetic piece can block the pressure release passage. When the handheld shower head is being used, the second magnetic piece along with the handheld shower head is taken down, and the first magnetic piece blocks the pressure release passage under the action of the elastic force from the elastic piece. The water in the water inlet cavity passes through the through hole, enters into the pressure control cavity but is not able to flow out. Hence, the water pressure in the pressure control cavity in front of the sealing washer increases and drives the sealing washer to move backward to press against the end of the water passage port to form a seal. The water inlet cavity and the water outlet cavity are disconnected, and the top shower head does not spray water. Conversely, under the action of the attraction force from the second magnetic piece, the first magnetic piece can overcome the elastic force from the elastic piece and moves away from the pressure release passage, so the water in the pressure control cavity flows into the water outlet cavity through the pressure release passage. Because the minimum cross-sectional area of the pressure release passage is greater than that of the through hole, the outflow rate of the water in the pressure control cavity is greater than its inflow rate. Under the action of the water pressure from the water inlet cavity at the rear side, the sealing washer moves forward and opens the water passage port. The water in the water inlet cavity directly flows into the outflow cavity of the top shower head, through the water passage port and the water outlet cavity. If the switching is achieved by employing the First Magnetic Piece directly, the water pressure in the Water Inlet Cavity may be too large so that the First Magnetic Piece is hard pressed against the Water Passage Port, allowing no opening for the flow. This requires increased suction force between the First Magnetic Piece and the Second Magnetic Piece to ensure the stability of the operation. However, using the construct of Pressure Control Cavity and Sealing Washer in conjunction with First Magnetic Piece, then, it is possible to use water pressure to open or close the Water Passage Port. Since the First Magnetic Piece is used to block only a smaller opening of the pressure relief channel, the need for magnetic attraction force between the First Magnetic Piece and the Second Magnetic Piece is reduced. So is the volume requirement of the First Magnetic Piece. This ensures the stability and reliability of the operation.

In the combined shower, the sealing structure also comprises a flow passage cavity located in front of the pressure control cavity, as well as a cylindrical pressure release cylinder. The pressure release cylinder is arranged along the front and back direction. The rear end of the pressure release cylinder enters into the water outlet cavity, and the front end of the pressure release cylinder passes through the pressure control cavity and connects to the flow passage cavity. The sealing washer is sleeved over the outside of the pressure release cylinder and can move back and forth, along the pressure release cylinder. The sealing washer tightly presses against the pressure release cylinder and forms a seal. The pressure release passage comprises the flow passage hole which can connect the pressure control cavity to the flow passage cavity, and the pressure release hole which is located inside the pressure release cylinder and connects the flow passage cavity to the water outlet cavity. Both hole diameters of the flow passage hole and the pressure release hole are greater than that of the through hole. The first magnetic piece is arranged inside the flow passage cavity, can press against the front end of the pressure release cylinder under the action of the elastic force from the elastic piece, and forms a seal. In addition, the design of the flow passage cavity allows the water inside the pressure control cavity to flow through the water passage cavity and then enter into the water outlet cavity. This facilitates the arrangement of the first magnetic piece and the assembly. Meanwhile, the first magnetic piece is arranged inside the flow passage cavity, instead of the pressure control cavity, which not only can prevent the first magnetic piece from affecting the water pressure inside the pressure control cavity, ensuring that the sealing washer can work stably under the water pressure inside the pressure control cavity, but also reduces the impact of water pressure on the movement of First Magnetic Piece, further reducing the magnitude requirement on the attraction force between the First Magnetic Piece and the Second Magnetic Piece, during the maneuver of the First Magnetic Piece.

In the combined shower, a sealing part made of rubber material is fixed to the rear of the first magnetic piece, where it faces the pressure release hole. It is easy for the first magnetic piece made of magnetic material to deviate during the movement and hence affects the seal. Connecting a sealing part ensures the seal on the pressure release hole by the first magnetic piece.

In another case, in the combined shower, the sealing structure comprises a swinging plate hinged on the front part of the water passage port. The elastic piece comprises a torsion spring connected to the hinge point. Under the action of the elastic force from the torsion spring, the swinging plate can lean against the end of the water passage port and forms a seal. The first magnetic piece is connected to the front side or rear side of the swinging plate. When the top shower head is not required to spray water, under the action of the elastic force from the torsion spring, the swinging plate can lean against the end of the water passage port and disconnects the water inlet cavity and the water outlet cavity. Conversely, under the action of the attraction force from the second magnetic piece, the first magnetic piece drives the swinging plate which is connected to it to swing forward, and hence the water passage port opens, so the water in the water inlet cavity flows through the water passage port, enters into the water outlet cavity and flows into the outflow cavity of the top shower head.

In another case, in the combined shower, the first magnetic piece is located in front of the water passage port. The elastic piece comprises a spring and the spring is arranged in front of the first magnetic piece. The sealing structure comprises a sheet-like sealing piece. The sealing piece is fixed on the rear side of the first magnetic piece, and the sealing piece, along with the first magnetic piece can tightly press against the end of the water passage port and forms a seal, under the action of the elastic force from the elastic piece. In a water environment where the water pressure is low and the requirement on the attraction force between the first magnetic piece and the second magnetic pieces is low, blocking the water passage port may be directly achieved by the first magnetic piece in coordination with the sealing piece. The structure is simple.

In the combined shower, the top shower head is of an arc shape and the gap is located in the lower part. The assembly hub is arranged at the rear side of the top shower head, and connects to the top shower head by the support bracket. The middle part of the top shower head forms a holder cavity for the placement of the handheld shower head, and the gap allows the handle part of the handheld shower head to pass through it. The outflow cavity of the handheld shower head can always keeps connected to the water inlet cavity, so when the handheld shower head is put into the holder cavity, not only the outflow cavity of the top shower head connects to the water inlet cavity to allow the top shower head to spray water, but also the handheld shower head keeps spraying water. In coordination with the arc shape of the top shower head, the water spraying area is largely increased. Besides, by having the handle part of the handheld shower head pass through the gap at the lower part of the top shower head, the position of the handheld shower head is further confined. This avoids its swing and improves the stability.

In the combined shower, the projecting limit blocks are fixed on both sides of the top shower head, which are adjacent to the gap. The rear ends of the limit blocks can press against the front end of the handheld shower head inside the holder cavity. By the two projecting limit blocks, in coordination with the attraction force between the first magnetic piece and the second magnetic piece, the handheld shower head is subject to forces at three points, so the fixation is more stable.

In the combined shower, the elastic piece is a spring and the two ends of the spring press against the inner wall of the assembly hub and the first magnetic piece respectively. By the means of the two ends of the spring pressing, the first magnetic piece is provided with a more stable action force, which ensures the working stability of the first magnetic piece.

In the combined shower described above, the assembly hub includes a cylindrical shell having a cavity therein. inside the cavity, coaxially with the shell and from the front to the back, is provided with the mounting seat, the disc-shaped magnet seat and spool seat, the annular valve seat, and the cylindrical pressure cap connector. the mounting seat, the spool seat, the valve seat, and the cylindrical pressure cap connector are plugged together. both the magnet seat and the elastic piece are arranged in the mounting seat. at the rear of the pressure cap connector is provided with a connection fitting for water inflow and a back cap for joining the connection fitting to the pressure cap connector. the components within the assembly hub are coaxially set up and then plugged in an order to form an integral body. this not only facilitates the sealing and installation of the, but also makes the entire structure more stable and less shaking during operation.

In the combined shower described above, the rear end of the mounting seat is provided with an annular plug. the spool seat has an annular slot at the front end thereof. the plug is inserted into the slot. the rear end of the spool seat has several protruding cylindrical pins. the valve seat is provided with several holes at the front end thereof. these matching pins are inserted into these holes. the edge of the sealing washer is pressed in between the spool seat and the valve seat. the rear end of the valve seat also has protruding columnar connection studs. the front end of the pressure cap connector has concave connection holes. the connection studs correspondingly insert into connection holes. a limiting slot for circumferentially limiting the valve seat is also provided in the axial direction on the side of the valve seat. the pressure cap connector has an external thread at its rear end. the front end of the back cap has an internal thread and has a threaded connection with the pressure cap connector. the front end of the connection fitting is located inside the pressure cap connector and the back cap and the back end of the connection fitting extends backwards from the middle of the back cap and is the water inlet. through the matched docking of plugs, slots, pins, holes, connection studs and connection holes, in conjunction with the thread connection between the pressure cap connector and the back cap, it is possible to further tighten the components of the entire structure as the back cap tightens along the threads, improving the sealing effect and the stability of the connection.

In the combined shower described above, the first magnetic piece is fixed inside the magnet seat. the center of rear side of the first magnetic piece is connected with the two block-shaped sealing parts made of a rubber material. the two the sealing parts, with the larger one in the front and the smaller one in the rear, are superposed into a step shape. the stepped up sealing parts provides doubled sealing with improved sealing effect.

In the combined shower described above, the rear side of the spool seat is recessed forward to form the pressure control cavity. the sealing washer is made of a rubber material and the sealing washer is provided at the opening of the pressure control cavity. the sealing washer can be deformed to the front or to the back by the action of hydraulic pressure. sealing washer is made of rubber material which can easily deform, so that it is deformed during use instead of the entire sealing washer being moved back and forth, removing the chance of the sealing washer being blocked or jammed.

In the combined shower, the valve seat has a flat outflow port, and the outflow port has the water outlet cavity. the water passage port is provided on the front side of the outflow port and is opposed to the sealing washer. a part of the water inlet cavity is formed between the two sides of the outflow port and the inner wall of the valve seat. the water outlet cavity is communicated with the first outlet chamber of the top shower head through the water outlet; both ends of the outflow port extending to the side wall of the valve seat and communicating with the water outlet through a vent punctured through the wall of the valve seat. the water flows through the space formed between the sides of the outflow port and the valve seat sidewall and exerts force on the sealing washer, making the sealing washer loaded under more even forces and, thus, easy to open. the above setup of the water inlet cavity and the provision of the vent make the whole structure more compact.

Compared to the prior art, one embodiment of the present combined shower has the following advantages:

1. The handheld shower head achieves the water spraying switch by the attraction force between the first magnetic piece and the second magnetic piece, without additionally operating knobs or buttons at a high position. The usage is easier.

2. The position restriction of the handheld shower head is achieved by the top shower head of an arc shape matching the handheld shower head of a roughly round shape, as well as the match between the gap and the handle part of the handheld shower head. In combination with the attraction force between the first magnetic piece and the second magnetic piece, and the position restriction by the two projecting limit blocks, the position of the handheld shower head is better fixed. This prevents the handheld shower head from falling off. The usage is more stable.

3. The middle part of the top shower head of an arc shape is reserved as a holder cavity, the head part of the handheld shower head is put inside the holder cavity, and both of the handheld shower head and the top shower head can spray water at the same time. This largely increases the water spraying area and improves the user experience.

DETAILED DESCRIPTION OF THE INVENTION

The embodiments of this invention will be described below and the technical solutions of the invention will be further illustrated in connection with the accompanying figures. However, the present invention shall not be limited to these embodiments.

First Embodiment

Figure 1:
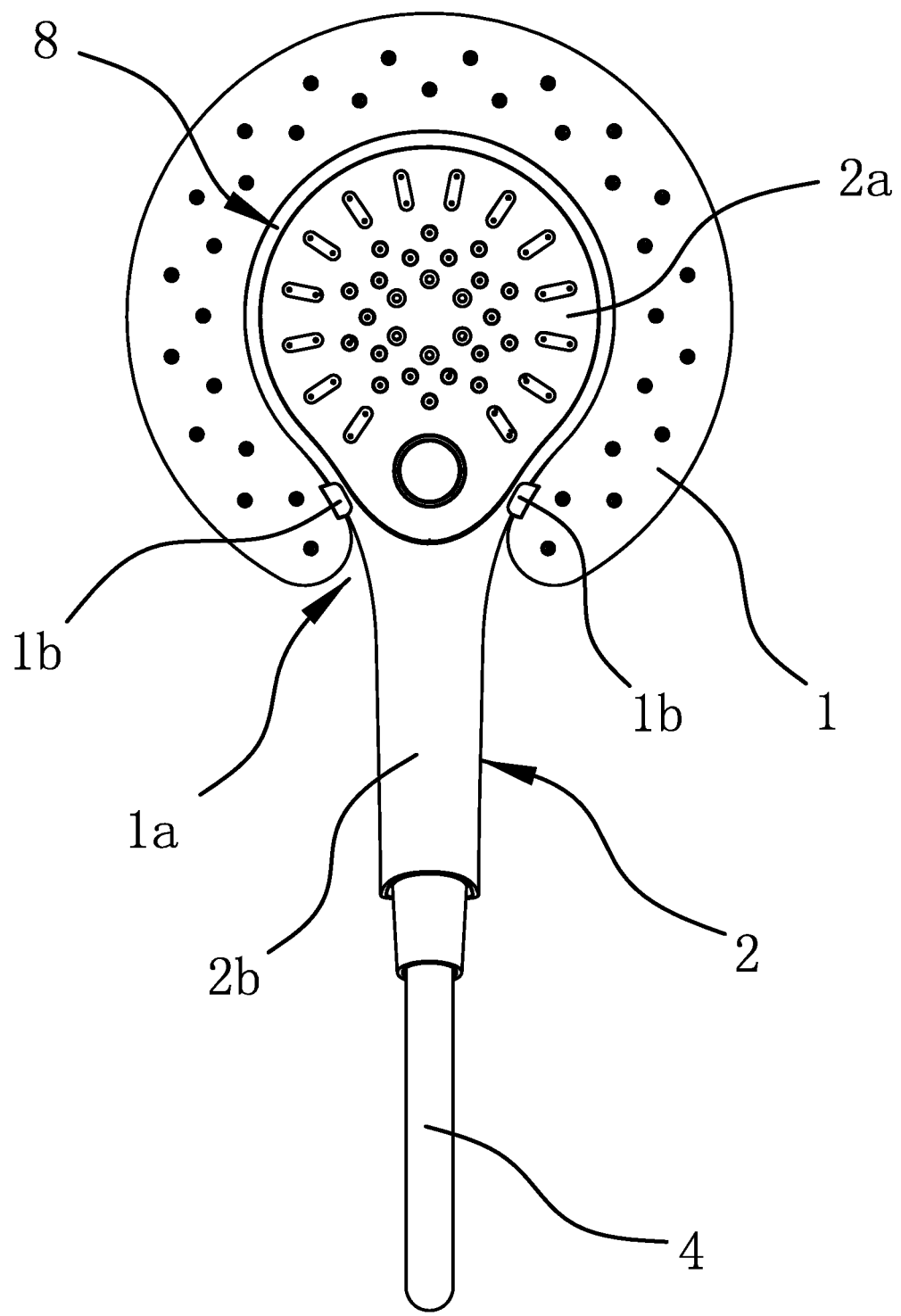
FIG. 1 is a schematic view of a First Embodiment of the present combined shower.
Figure 2:
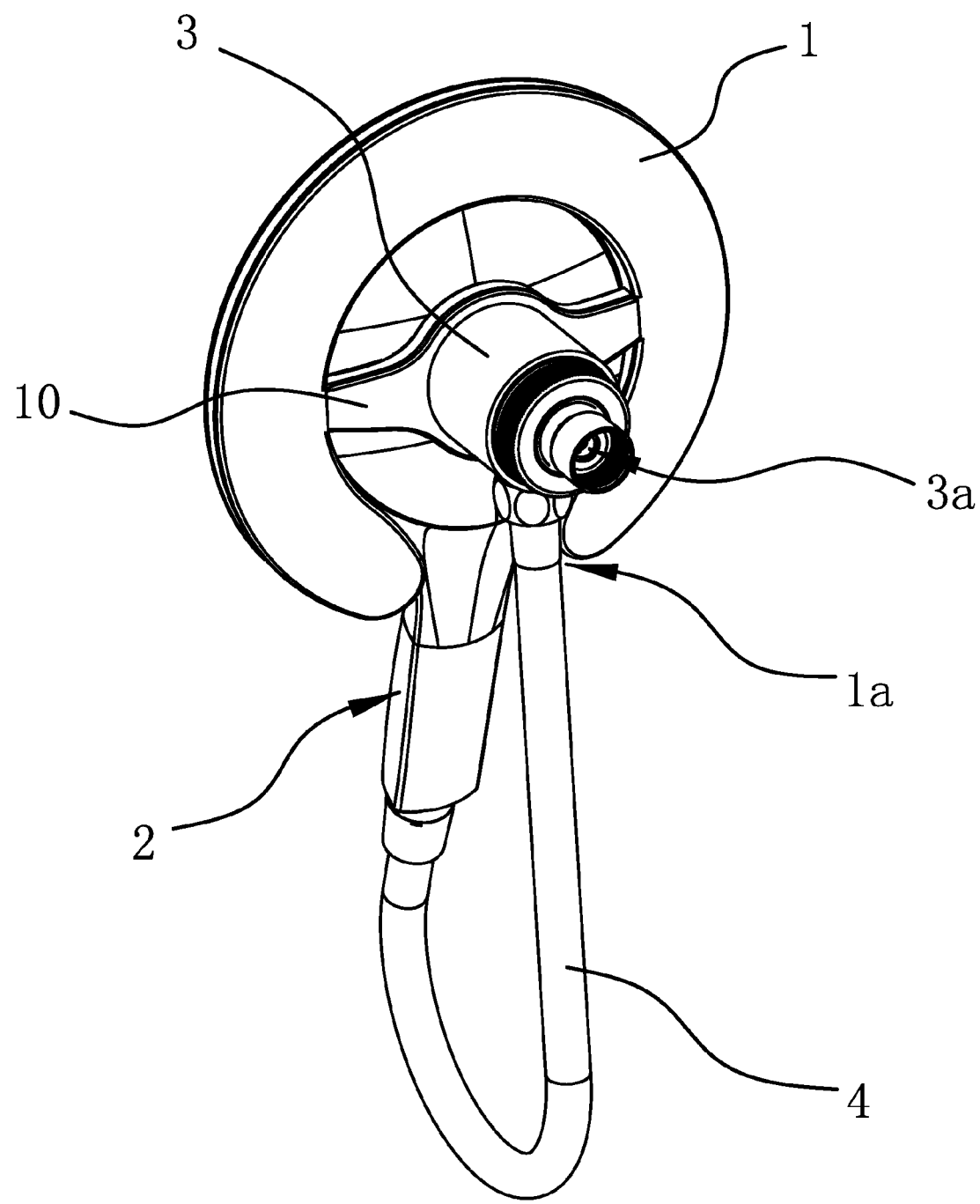
FIG. 2 is a schematic view of a First Embodiment of the present combined shower from another angle of view.
Figure 3:
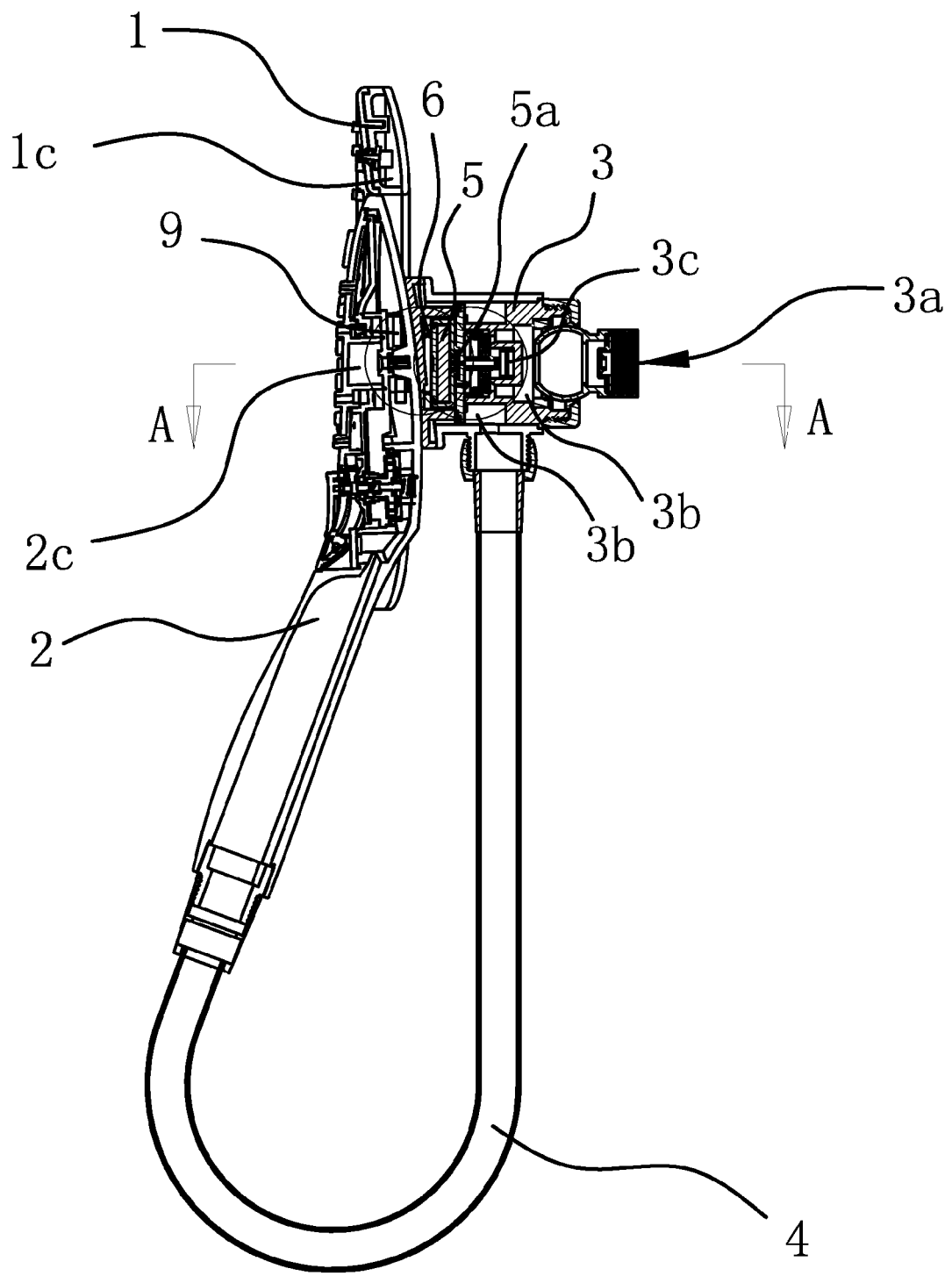
FIG. 3 is a sectional schematic view of a First Embodiment of the present combined shower.

As shown in FIG. 1, FIG. 2 and FIG. 3, the present combined shower comprises a top shower head (1), a handheld shower head (2) and an assembly hub (3) which has a water inlet (3a). The top shower head (1) has the First Outlet Chamber (1c). The handheld shower head (2) has the Second Outlet Chamber (2c). The assembly hub (3) has a water inlet cavity (3b) inside that connects to the water inlet (3a). The Second Outlet Chamber (2c) of the handheld shower head (2) always connects to the water inlet cavity (3b) through the water hose (4).

Here, inside the assembly hub (3), there is also the first magnetic piece (5), an elastic piece (6) and a sealing structure which can connect or block the First Outlet Chamber (1c) of the top shower head (1) and the water inlet cavity (3b). Without any effects of external forces, under the action of the elastic force from the elastic piece (6), the first magnetic piece (5) moves and makes the sealing structure block the First Outlet Chamber (1c) of the top shower head (1) from the water inlet cavity (3b). A holder cavity (8) to hold the handheld shower head (2) is designed in front of the assembly hub (3) as well. The second magnetic piece (9) of a bulk shape is fixed on the area near the rear end of the handheld shower head (2) and the second magnetic piece (9) is arranged magnetically opposite and facing the first magnetic piece (5). Under the action of the attraction force from the second magnetic piece (9), the first magnetic piece (5) can overcome the elastic force from the elastic piece (6), moves in the opposite direction, and connects the First Outlet Chamber (1c) of the top shower head (1) to the water inlet cavity (3b).

Figure 5:
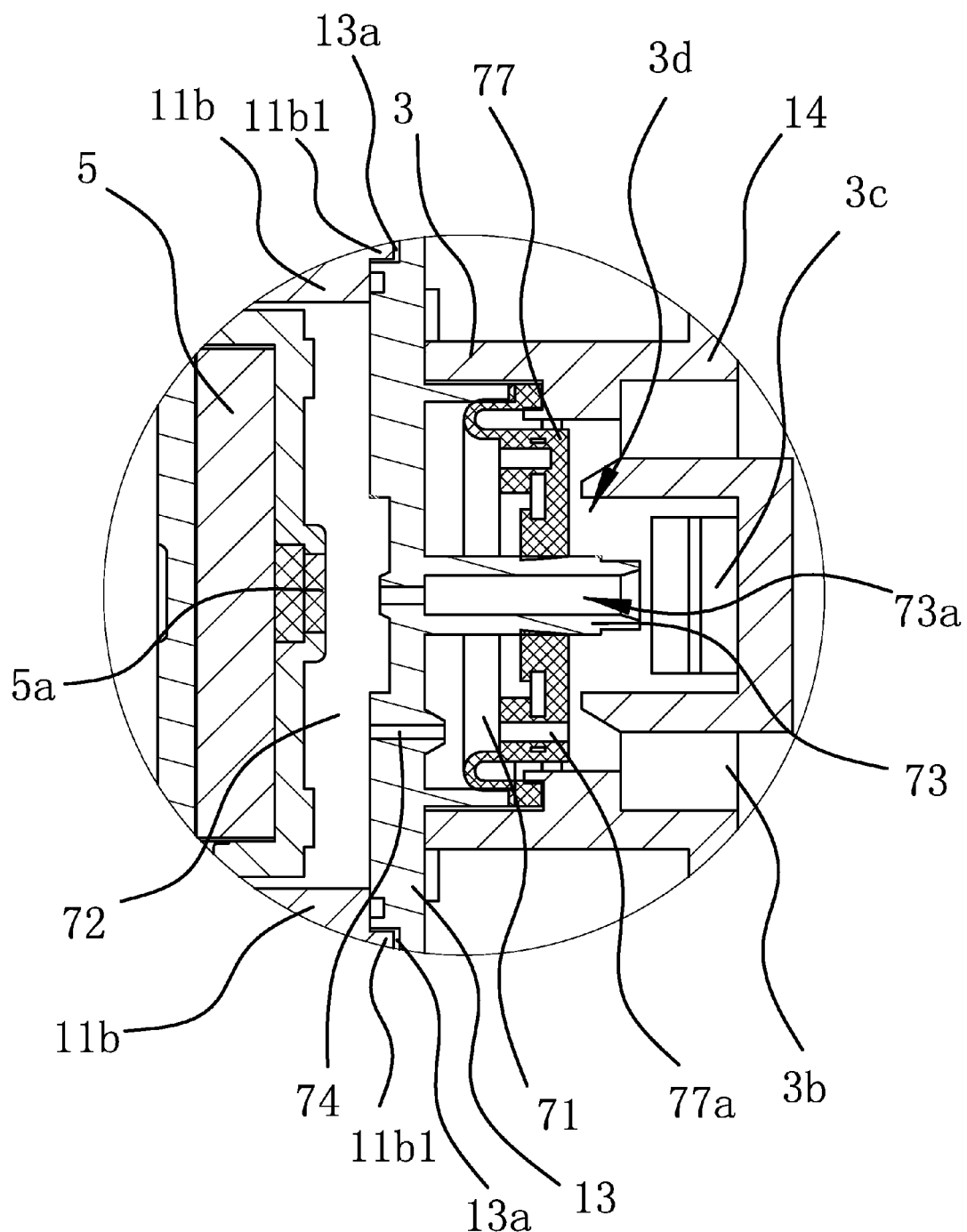
FIG. 5 is an enlarged view of the sealing structure of a First Embodiment of the present combined shower where the Water Passage Port is opened.

In this embodiment, the handheld shower head (2) comprises a roughly round head part (2a) and a handle part (2b). The water hose (4) is a soft hose. The elastic piece (6) is a spring and the two ends of the spring press against the inner wall of the assembly hub (3) and the first magnetic piece (5) respectively. Both of the first magnetic piece (5) and the second magnetic piece (9) are strong magnets. As shown in FIG. 5, the top shower head (1) is of an arc shape and the gap (1a) is located in the lower part. The assembly hub (3) is arranged at the rear side of the top shower head (1) and in line with the center of the top shower head (1). The assembly hub (3) connects to the top shower head (1) by the support bracket (10). The middle part of the top shower head (1) forms a holder cavity (8) for the placement of the head part (2a) of the handheld shower head (2), and the gap (1a) allows the handle part (2b) of the handheld shower head (2)

to pass through it. The projecting limit blocks (1b) are fixed on both sides of the top shower head (1), which are adjacent to the gap (1a). The rear ends of the limit blocks (1b) can press against the front end of the handheld shower head (2) inside the holder cavity (8), so as to limit the position of the handheld shower head (2).

Figure 4:
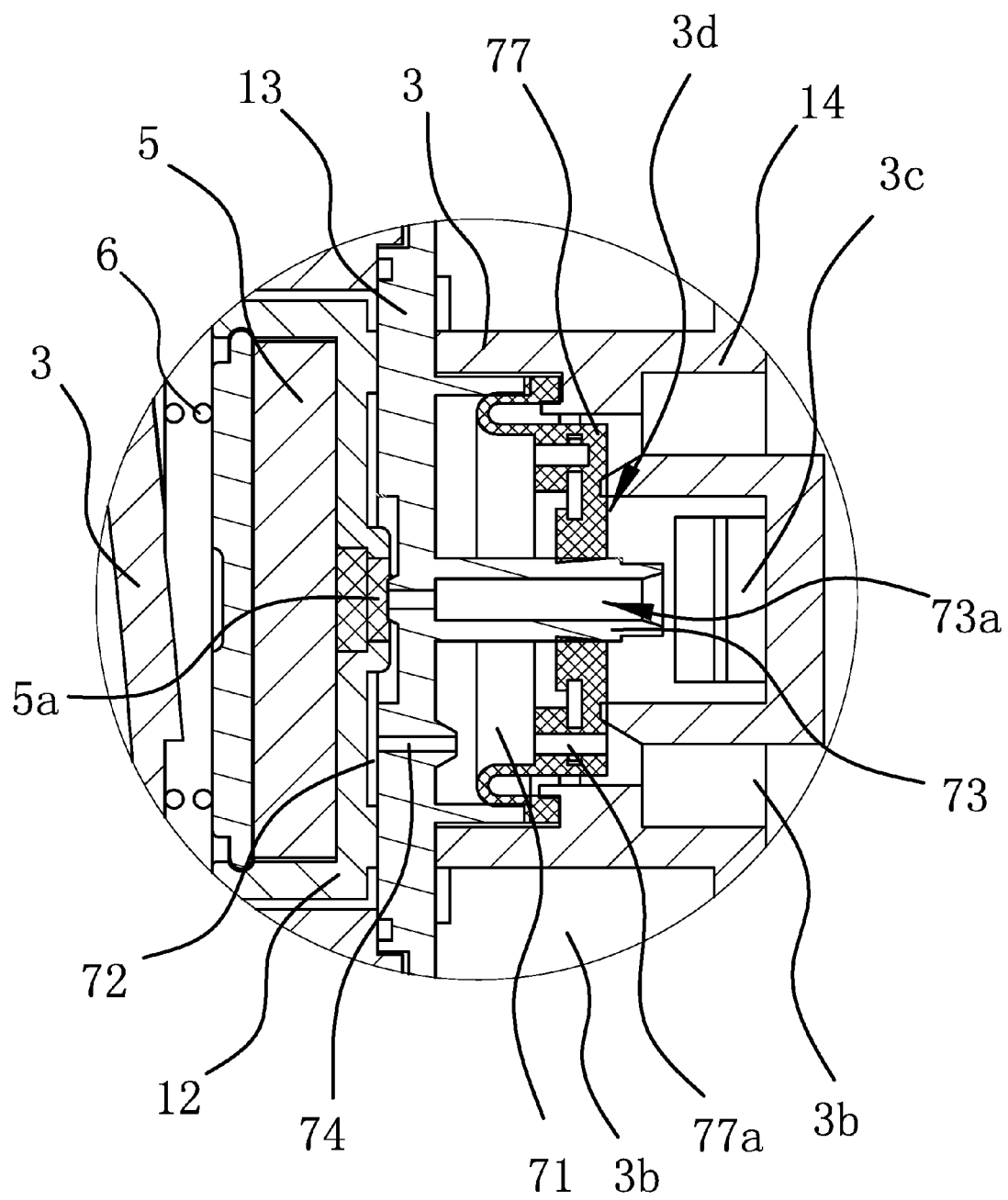
FIG. 4 is an enlarged view of the sealing structure of a First Embodiment of the present combined shower where the Water Passage Port is closed.
Figure 6:
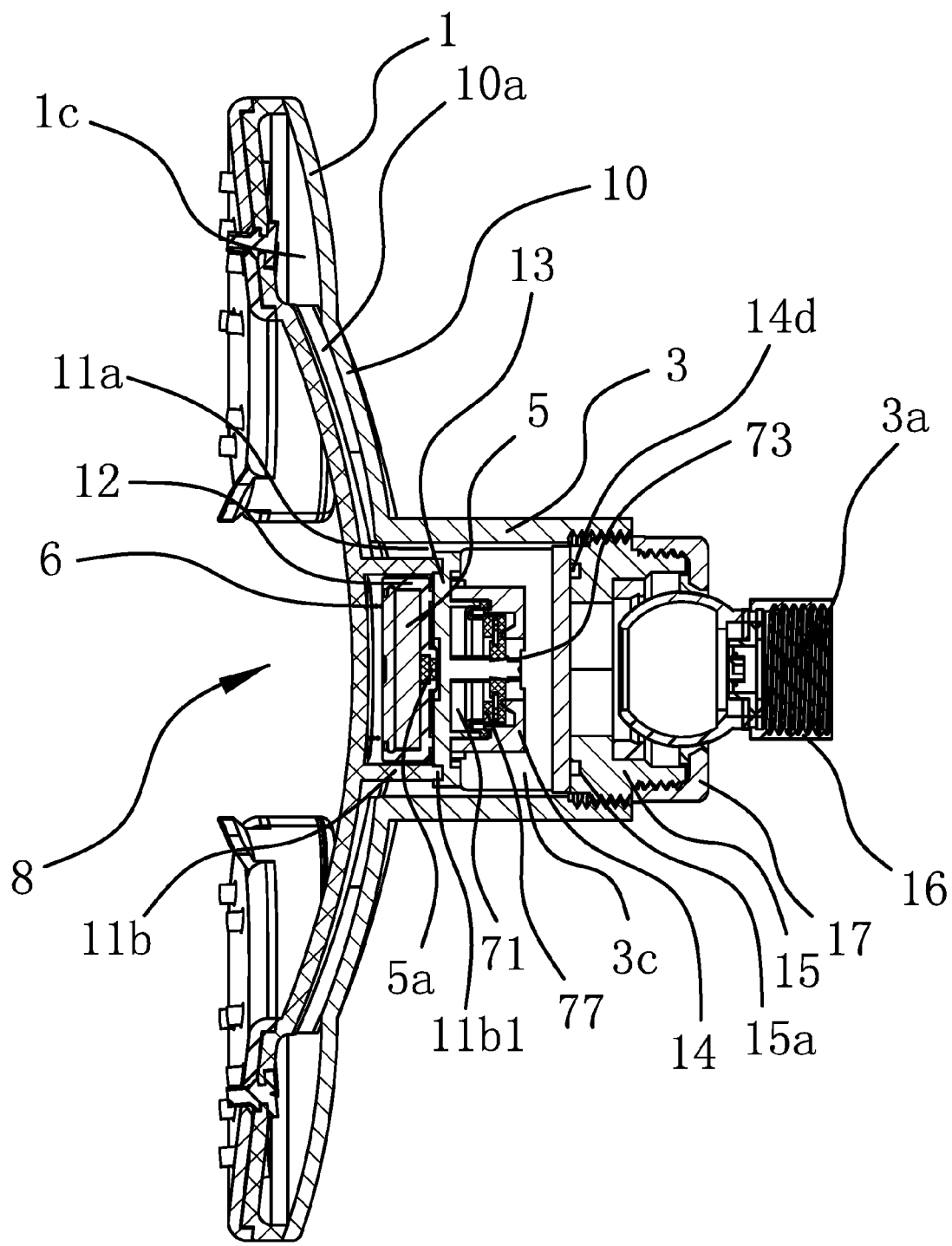
FIG. 6 is a cross-sectional view taken along line A-A of the combined shower in FIG. 3 after the Handheld Shower Head is removed.

As shown in FIG. 4, FIG. 5, and FIG. 6, the assembly hub (3) also has a water outlet cavity (3c) inside. The water outlet cavity (3c) connects to the First Outlet Chamber (1c) of the top shower head (1) through the Water Outlet (10a). The Water Outlet (10a) is designed inside the support bracket (10). The water outlet cavity (3c) also connects to the water inlet cavity (3b) through a water passage port (3d), and the water passage port (3d) faces forward. The sealing structure is arranged in front of the water passage port (3d), the first magnetic piece (5) is arranged in front of the sealing structure, and the elastic piece (6) is arranged in front of the first magnetic piece (5). Under the action of the elastic force from the elastic piece (6), the first magnetic piece (5) can drive the sealing structure to open or close the water passage port (3d).

Specifically, the sealing structure comprises a pressure control cavity (71) located in the front area of the water passage port (3d), and a sealing washer (77) arranged between the pressure control cavity (71) and the water outlet cavity (3c). Under the action of the water pressures from the front and rear sides, the sealing washer (77) can move back and forth. When the sealing washer moves backward, it can press against the end of the water passage port (3d) and form a seal. On the sealing washer (77), there is a through hole (77a) which can connect the water inlet cavity (3b) to the pressure control cavity (71), and a pressure release passage which can connect the pressure control cavity (71) to the water outlet cavity (3c). The minimum cross-sectional area of the pressure release passage is greater than that of the through hole (77a).

Figure 11:
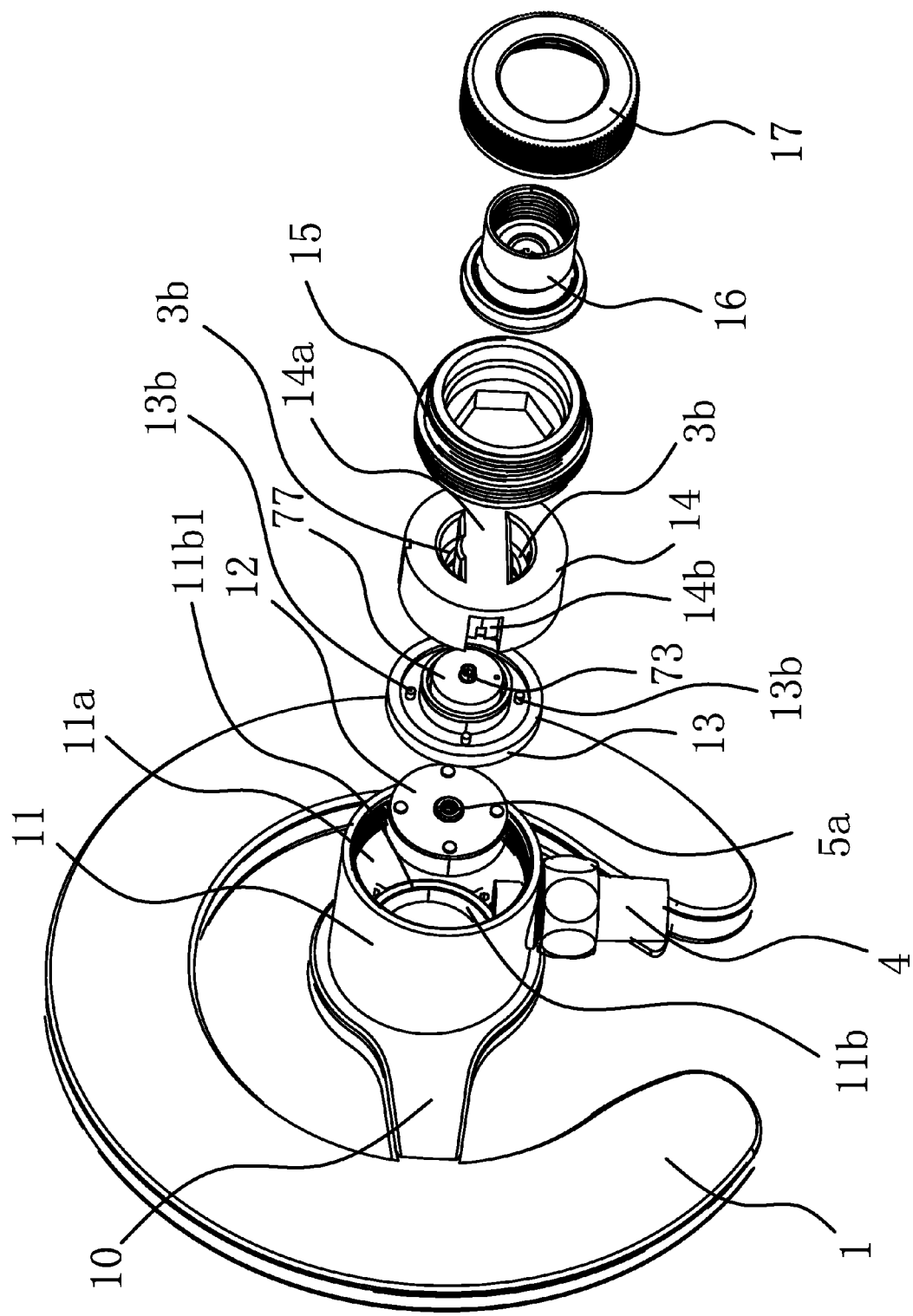
FIG. 11 is an exploded structural view of Assembly Hub in a First embodiment of the present combined shower.
Figure 12:
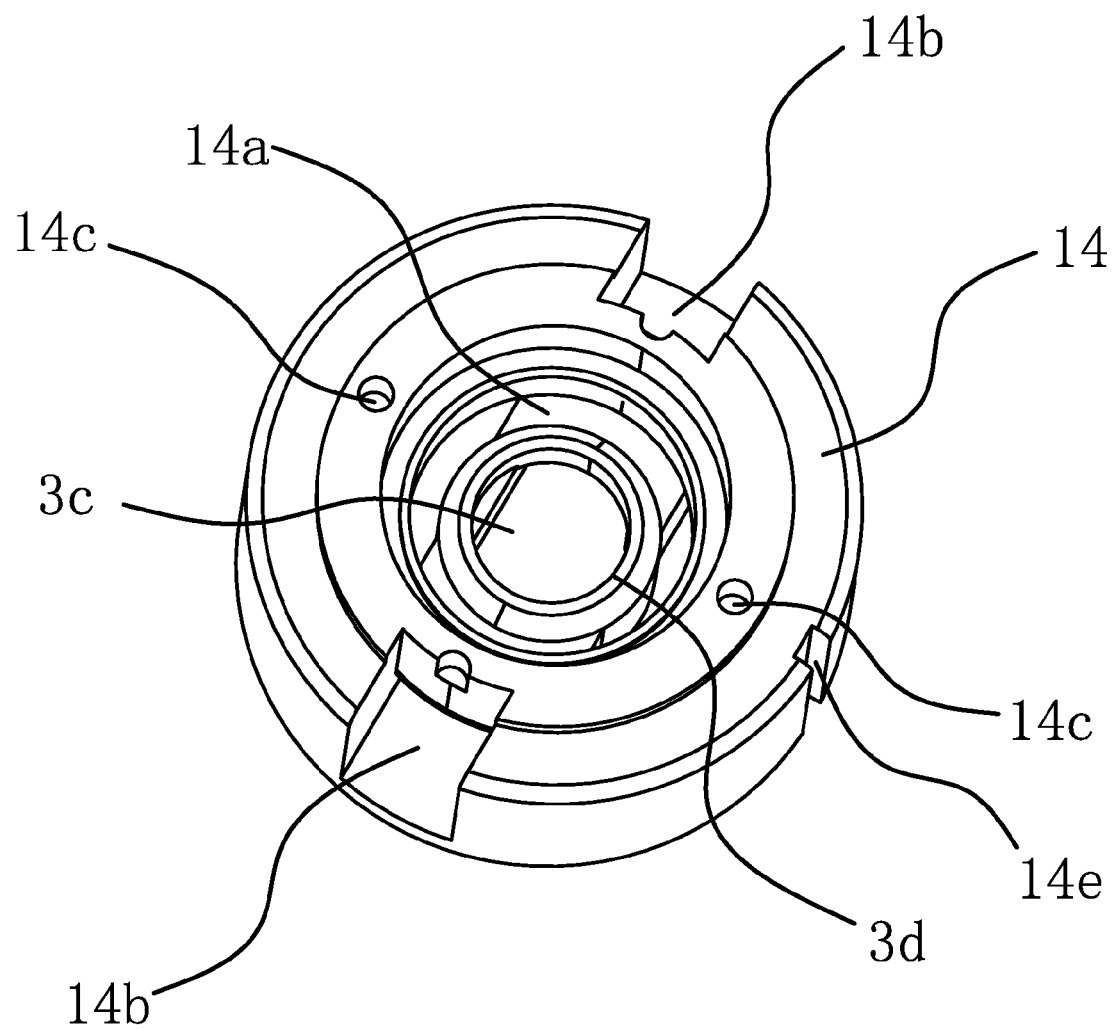
FIG. 12 is a schematic structural view of Valve Seat in the Assembly Hub of the present combined shower.
Figure 13:
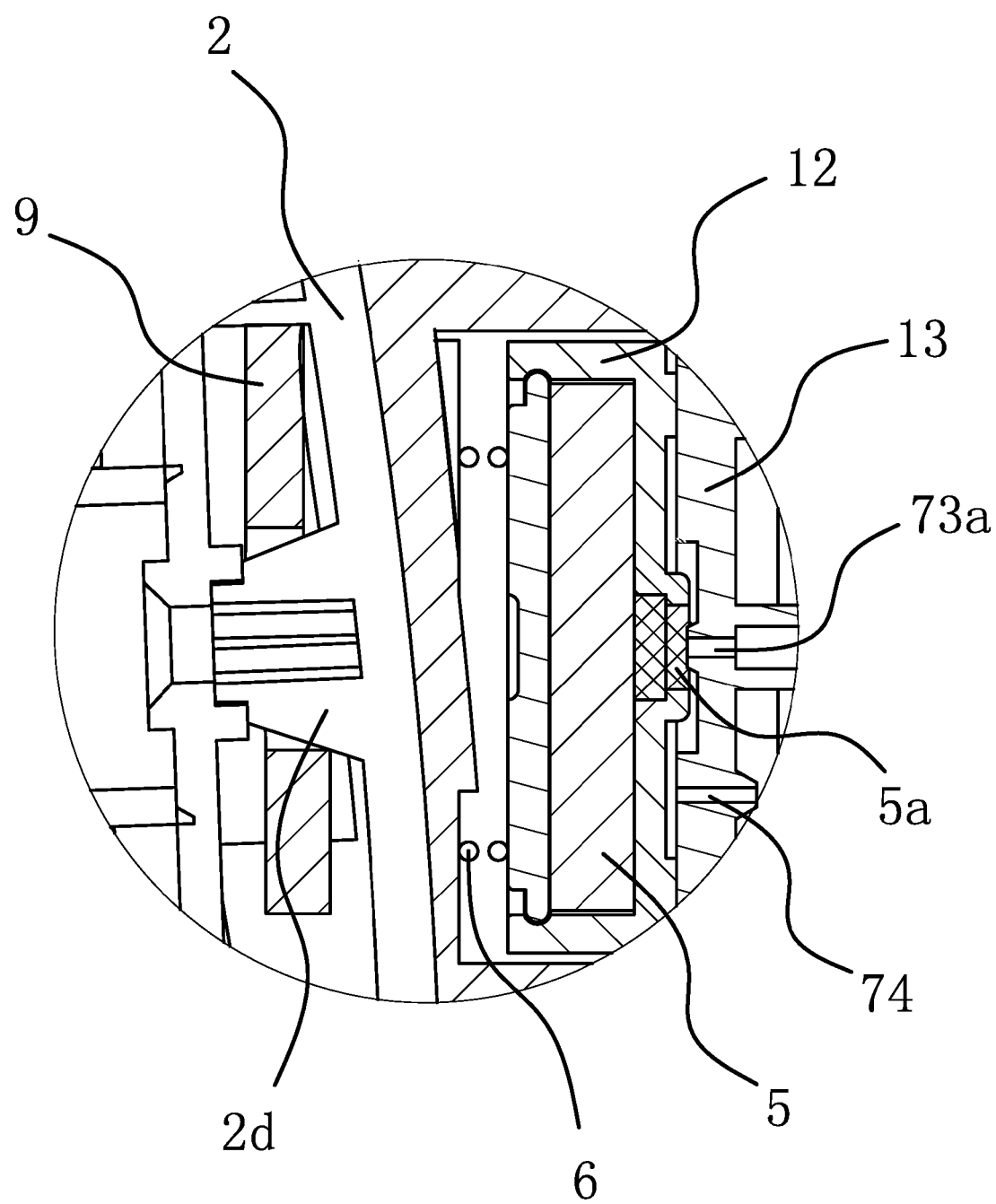
FIG. 13 is an enlarged view of where the Handheld Shower Head shown in FIG. 3 is placed into the Top Shower Head.

As shown in FIG. 11 and FIG. 12, in the present embodiment, the Assembly Hub (3) includes a cylindrical shell (11) formed integrally with the Support Bracket (10), and a Cavity (11a) is provided in the shell (11). Inside the Cavity (11a), coaxially with the Shell (11) and from the front to the back, is provided with the Mounting Seat (11b), the disc-shaped Magnet Seat (12) and Spool Seat (13), the annular Valve Seat (14), and the cylindrical Pressure Cap Connector (15). At the rear of the Pressure Cap Connector (15) is provided with a Connection Fitting (16) for water inflow and a Back Cap (17) for joining the Connection Fitting (16) to the Pressure Cap Connector (15).

Here, the front end of the Mounting Seat (11b) is integrally connected to the Shell (11) and the rear end of the Mounting Seat (11b) is provided with an annular Plug (11b1). The Spool Seat (13) has an annular concave Slot (13a) at the front end thereof. The Plug (11b1) is inserted into the Slot (13a) and sealed to form the Flow Passage Cavity (72). The Magnet Seat (12) and the Elastic Piece (6) are provided within the Flow Passage Cavity (72) in the Mounting Seat (11b). The rear end of the Spool Seat (13) has several protruding cylindrical Pins (13b). The several Pins (13b) are distributed evenly around the axis of the Spool Seat (13). The Valve Seat (14) is provided with several Holes (14c) at the front end thereof. These matching Pins (13b) are inserted into these Holes (14c). The edge of the Sealing Washer (77) is pressed in between the Spool Seat (13) and the Valve Seat (14). The rear end of the Valve Seat (14) also has protruding columnar Connection Studs (14d). The front end of the Pressure Cap Connector (15) has concave Connection Holes (15a). The Connection Studs (14d) correspondingly insert into Connection Holes (15). A Limiting Slot (14e) for circumferentially limiting the Valve Seat (14) is also provided in the axial direction on the side of the Valve Seat (14). Specifically, the First Magnetic Piece (5) is fixed inside the Magnet Seat (12). The center rear side of the First Magnetic Piece (5) is connected with the two block-shaped Sealing Parts made of a rubber material. The two the Sealing Parts (5a), with the larger one in the front and the smaller one in the rear, are superposed into a step shape. The Magnet Seat (12) can move towards the Spool Seat (13) at the same time with the First Magnetic Piece (5) and the Sealing Parts (5a), under the elastic force of the Elastic Piece (6) provided on the front side of the Magnet Seat (12). The Magnet Seat (12), the First Magnetic Piece (5), the Sealing Parts (5a) and the Elastic Piece (6) are placed inside the Flow Passage Cavity (72).

The rear side of the Spool Seat (13) is recessed forward to form the above-mentioned Pressure Control Cavity (71). The Pressure Control Cavity (71) opens to the rear and is opposite to the Water Passage Port (3d) located on the rear side of the Pressure Control Cavity (71) and the opening is larger in size than the Water Passage Port (3d). The Sealing Washer (77) is provided at the opening of the Pressure Control Cavity (71). The Sealing Washer (77) is made of a rubber material and whose peripheral edge is compressed and sealed by the rear side of the Spool Seat (13) and the front side of the Valve Seat (14). The Seal Washer (77) can deform to the front or to the rear, under water pressurization. When the Sealing Washer (77) is seated against the end opening of the Water Passage Port (3d) forming a seal, the unrestricted outer edge of the Sealing Washer (77) extends out of the Water Passage Port (3d) and contacts the water inside the Water Inlet Cavity (3b). The Hole (77a) is opened on the outer edge of the Sealing Washer (77).

The rear side of the Spool Seat (13) also has a protruding cylindrical Pressure Release Cylinder (73). The Pressure Release Cylinder (73) is provided in the forward and backward direction. The rear end of the Pressure Release Cylinder (73) passes through the Sealing Washer (77) and the Water Passage Port (3d) and extends into the Water Outlet Cavity (3c). The front end of the Pressure Release Cylinder (73) passes through the Pressure Control Cavity (71) and is connected to the Flow Passage Cavity (72). The Sealing Washer (77) is sleeved over the Pressure Release Cylinder (73) and moves back and forth along the Pressure Release Cylinder (73). The Sealing Washer (77) is tightly abutted against the Pressure Release Cylinder (73) and is always sealed. The above mentioned pressure relief passage includes a Flow Passage Hole (74) punctured on the Spool Seat (13) and which connects the Pressure Control Cavity (71) with the Flow Passage Cavity (72) and the Pressure Release Hole (73a) in the Pressure Release Cylinder (73) and which connects the Flow Passage Cavity (72) with the Water Outlet Cavity (3c). The Flow Passage Hole (74) and the Pressure Release Hole (73a) all have larger diameter than that of the Through Hole (77a). Under the elastic force of the Elastic Piece (6), The First Magnetic Piece (5) and the Magnet Seat (12) are able to drive the Sealing Parts (5a) to press against the front end of the Pressure Release Cylinder (73) on the Spool Seat (13) and to form a seal.

The Valve Seat (14) has a flat Outflow Port (14a). The Outflow Port (14a) has the above described Water Outlet Cavity (3c). The Water Passage Port (3d) is designed on the front side of the Outflow Port (14a) and is opposite to the Sealing Washer (77). The two sides of the Outflow Port (14a) and the inner wall of the valve seat (14) form a part of the above Water Inlet Cavity (3b). The Outflow Port (14a)

has both ends extending to the side wall of the Valve Seat (14) and communicating with the Water Outlet (10*a*) through the Vent (14*b*) punctured through the side wall of the Valve Seat (14). The front end of the Pressure Cap Connector (15) is in close contact with, or integral with, the rear end of the Valve Seat (14). The rear end of the Pressure Cap Connector (15) has male threads and the front end of the Back Cap (17) has female threads and has a threaded connection with the Pressure Cap Connector (15). The front end of the Connection Fitting (16) is located within the Pressure Cap Connector (15) and the Back Cap (17) and the rear end of the Connection Fitting (16) extends rearward from the middle of the Back Cap (17) and extends out of the above described Water Inlet (3*a*).

Figure 10:
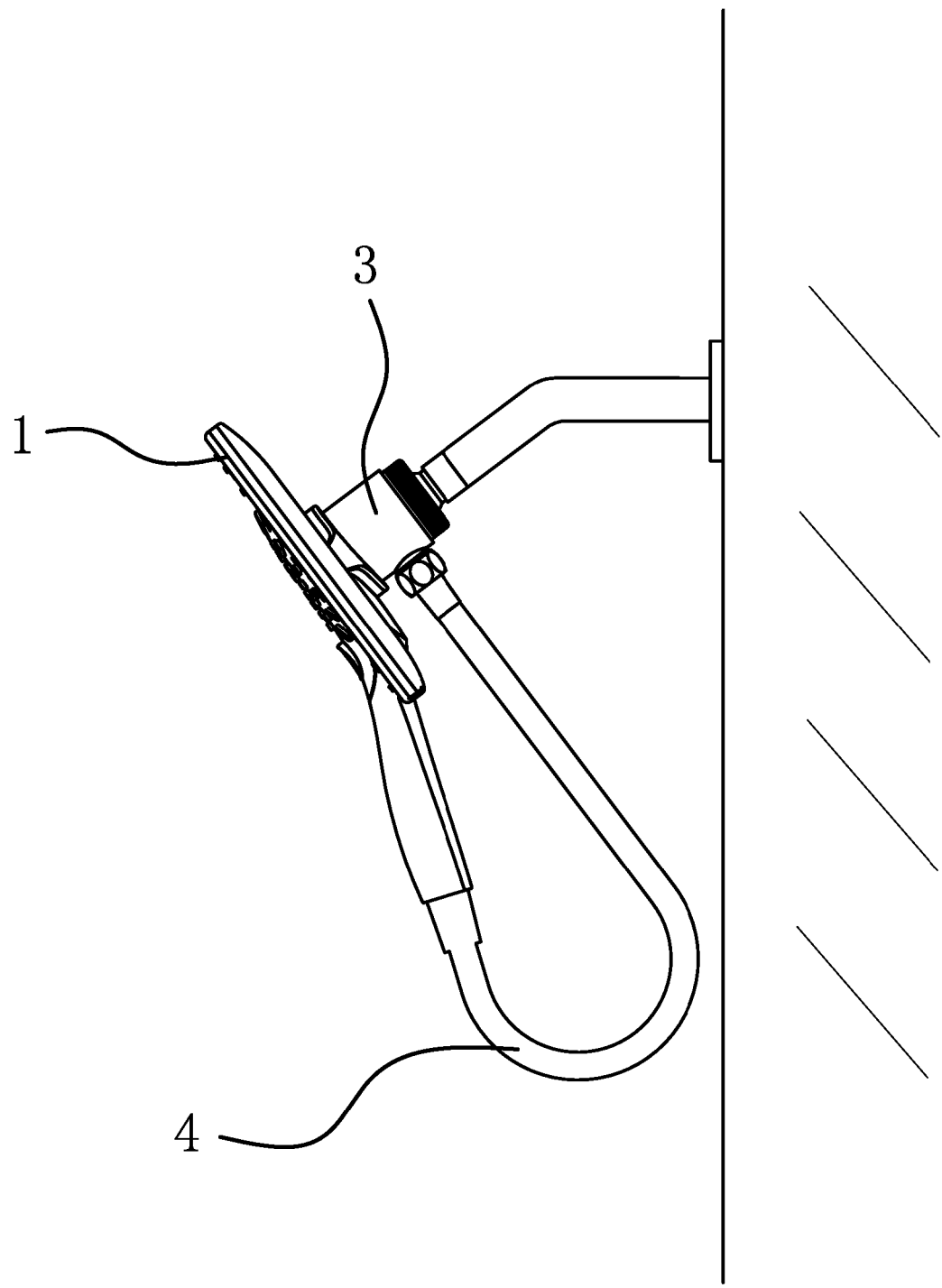
FIG. 10 is a view showing the present combined shower during usage.

As shown in FIG. 10, when the present combined shower is used, the assembly hub (3) is secured to the wall by tube fittings. If the handheld shower head (2) is needed, the user may hold the handle part (2*b*) of the handheld shower head (2) and push the handheld shower head (2) upward to have its front side detach from the limit blocks (1*b*). Hence, the handheld shower head (2) can be taken down. At this point, the first magnetic piece (5) inside the assembly hub (3) is not subject to the attraction force from the second magnetic piece (9) on the handheld shower head (2). Under the action of the elastic force from the elastic piece (6), it drives the sealing part (5*a*) to move backward and block the pressure release hole (73*a*). Therefore, water in the water inlet cavity (3*b*) flows into the pressure control cavity (71) through the through hole (77*a*) on the sealing washer (77), and then flows into the flow passage cavity (72) through the flow passage hole (74) but cannot flow into the water outlet cavity (3*c*). With the water pressure inside the pressure control cavity (71) gradually increasing, the sealing washer (77) is subject to the water pressure in the pressure control cavity (71), deforms backward and blocks the water passage port (3*d*), so the water inlet cavity (3*b*) and the water outlet cavity (3*c*) are disconnected. Hence, the water can only flow into the outflow cavity of the handheld shower head (2) through the water hose (4), and sprays out from the spraying panel of the handheld shower head (2), while the top shower head (1) does not spray water.

Conversely, when the top shower head (1) is needed, the user may put the head part (2*a*) of the handheld shower head (2) into the holder cavity (8) which is slightly bigger than the head part (2*a*) of the handheld shower head (2). At this point, the second magnetic piece (9) inside the handheld shower head (2) is subject to the attraction force from the first magnetic piece (5) and secures the handheld shower head (2). In coordination with the two limit blocks (1*b*), a three-point fixation of the handheld shower head (2) is achieved. Meanwhile, the first magnetic piece (5) is subject to the attraction force from the second magnetic piece (9) inside the handheld shower head (2), overcomes the elastic force from the elastic piece (6), and moves forward. This makes the sealing part (5*a*) separate from the pressure release hole (73*a*), and the pressure release hole (73*a*) is open again. Because both hole diameters of the pressure release hole (73*a*) and the flow passage hole (74) are greater than that of the through hole (77*a*), the flow rate of the water in the pressure control cavity (71) flowing into the water outlet cavity (3*c*) through the flow passage hole (74) and the pressure release hole (73*a*), is greater than the supplying rate of the water in the water inlet cavity (3*b*) flowing into the pressure control cavity (71) through the through hole (77*a*). The water pressure in the pressure control cavity (71) gradually decreases. The sealing washer (77) is subject to the higher water pressure in the water inlet cavity (3*b*), deforms toward the pressure control cavity (71) and detach from the water passage port (3*d*), so that the water outlet cavity (3*c*) connects to the water inlet cavity (3*b*) through the water passage port (3*d*). The water can directly flow into the outflow cavity of the top shower head (1) through the water passage port (3*d*) and the water outlet cavity (3*c*), and then spray out from the spraying panel of the top shower head (1). At the same time, the handheld shower head (2) is also spraying water, so the handheld shower head (2) and the top shower head (1) surrounding the handheld shower head (2) are both spraying water. This largely increases the water spraying area.

During the usage of the present combined shower, the connection control over the water passage of top shower head (1) is achieved by the user taking down or hanging up the handheld shower head (2), without manually turning the switch knob on the top shower head (1). It does not require a tall stature of the user and is easier to use.

Second Embodiment

As shown in FIG. 6, this Second Embodiment is roughly the same as the technical proposal in First Embodiment. The differences are:

The sealing structure comprises a swinging plate (75) hinged on the front part of the water passage port (3*d*). The elastic piece (6) comprises a torsion spring connected to the hinge point. Under the action of the elastic force from the torsion spring, the swinging plate (75) can lean against the end of the water passage port (3*d*) and forms a seal. The first magnetic piece (5) is connected to the front side of the swinging plate (75) and can drive the swinging plate (75) to swing back and forth. Of course, the first magnetic piece (5) may also be connected to the rear side of the swinging plate (75) as needed.

When the top shower head (1) is not required to spray water, the second magnetic piece (9), along with the handheld shower head (2), is taken down. Under the action of the elastic force from the torsion spring, the swinging plate (75) can lean against the end of the water passage port (3*d*) and disconnects the water inlet cavity (3*b*) from the water outlet cavity (3*c*). Conversely, under the action of the attraction force from the second magnetic piece (9), the first magnetic piece (5) drives the swinging plate (75) which is connected to it to swing forward, and hence the water passage port (3*d*) opens, so the water in the water inlet cavity (3*b*) flows through the water passage port (3*d*), enters into the water outlet cavity (3*c*) and flows into the outflow cavity of the top shower head (1).

Third Embodiment

Figure 7:
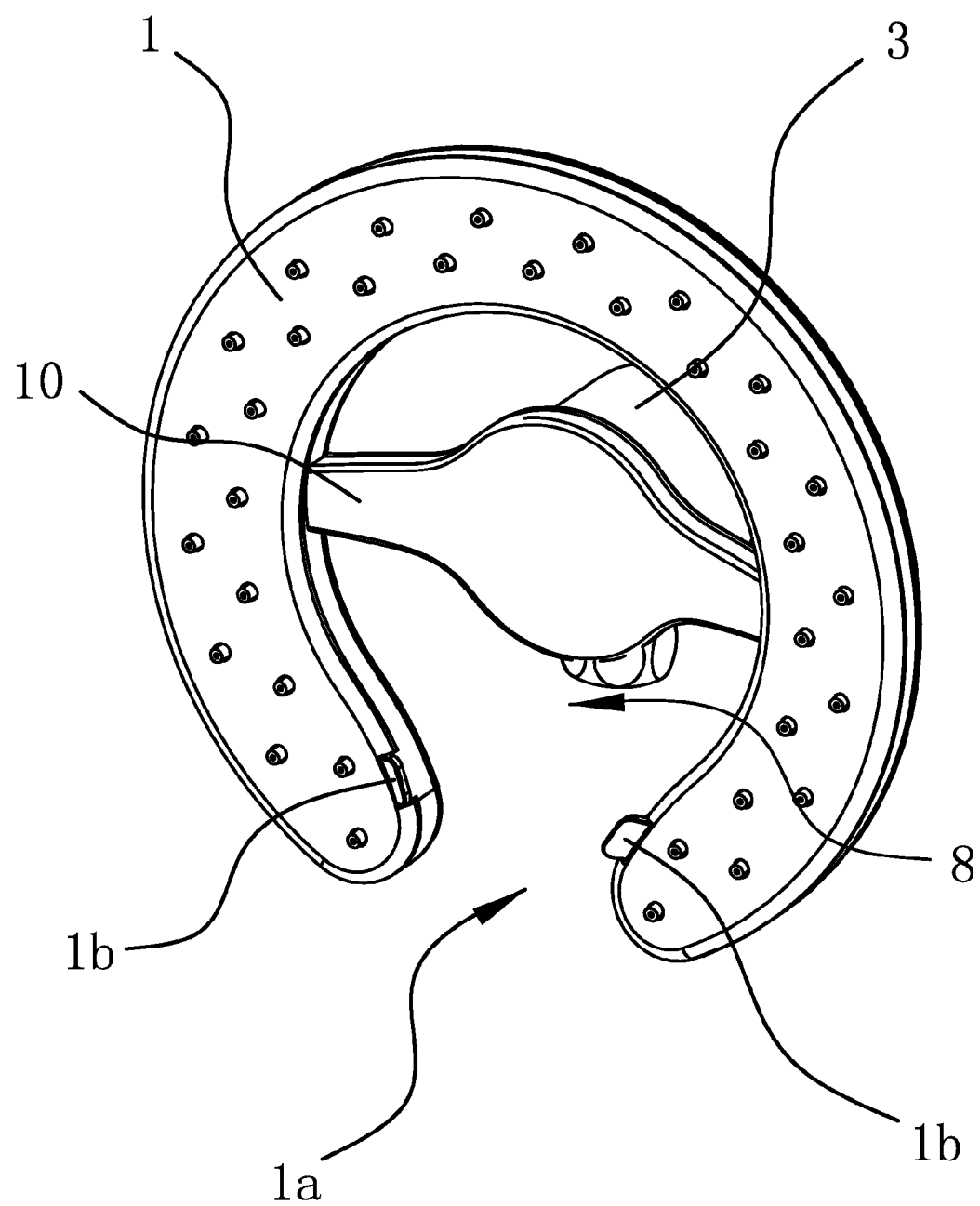
FIG. 7 is a schematic structural view of the Top Shower Head in the present combined shower.
Figure 8:
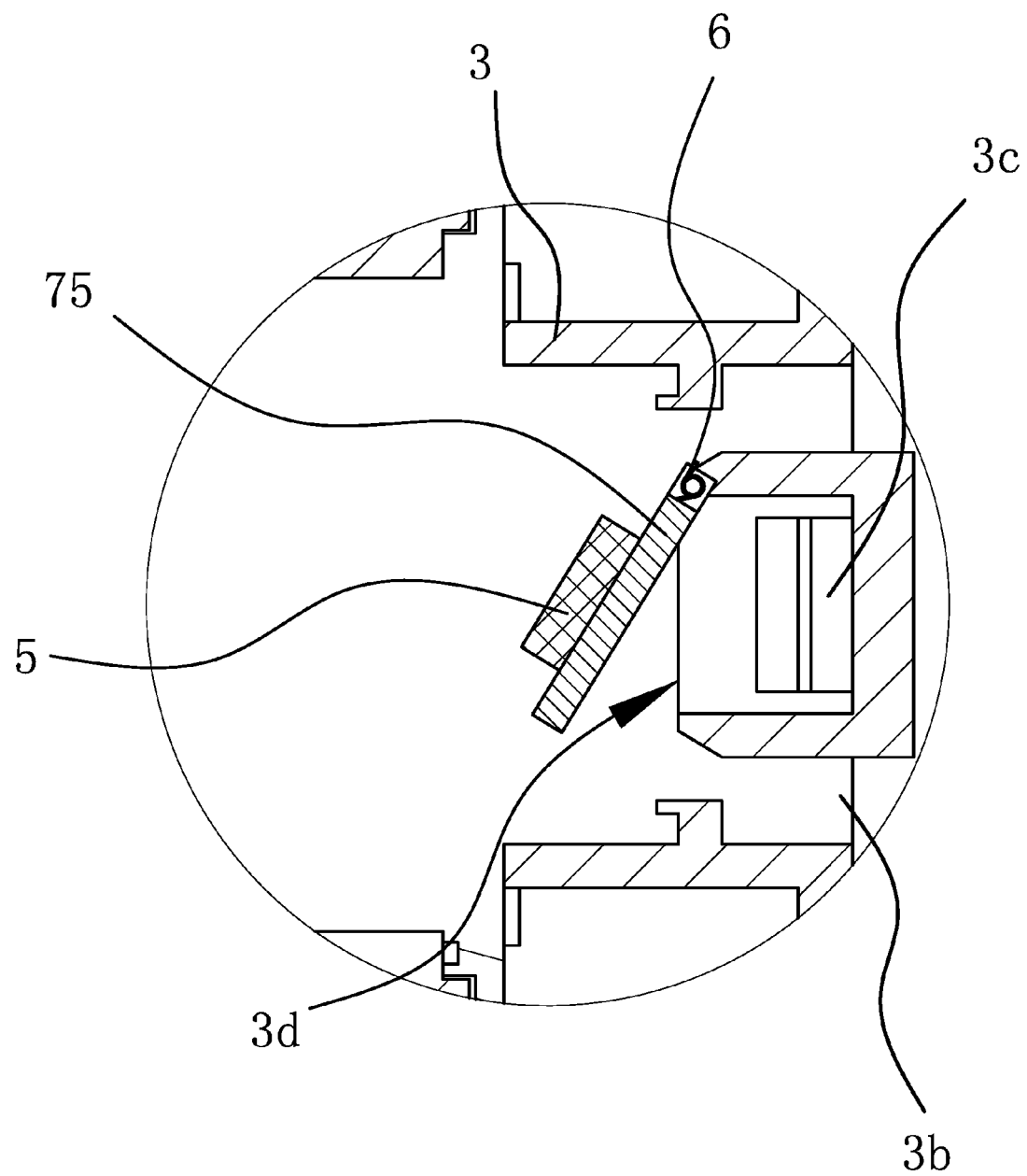
FIG. 8 is a schematic structural view of the sealing structure of a Second Embodiment of the present combined shower.
Figure 9:
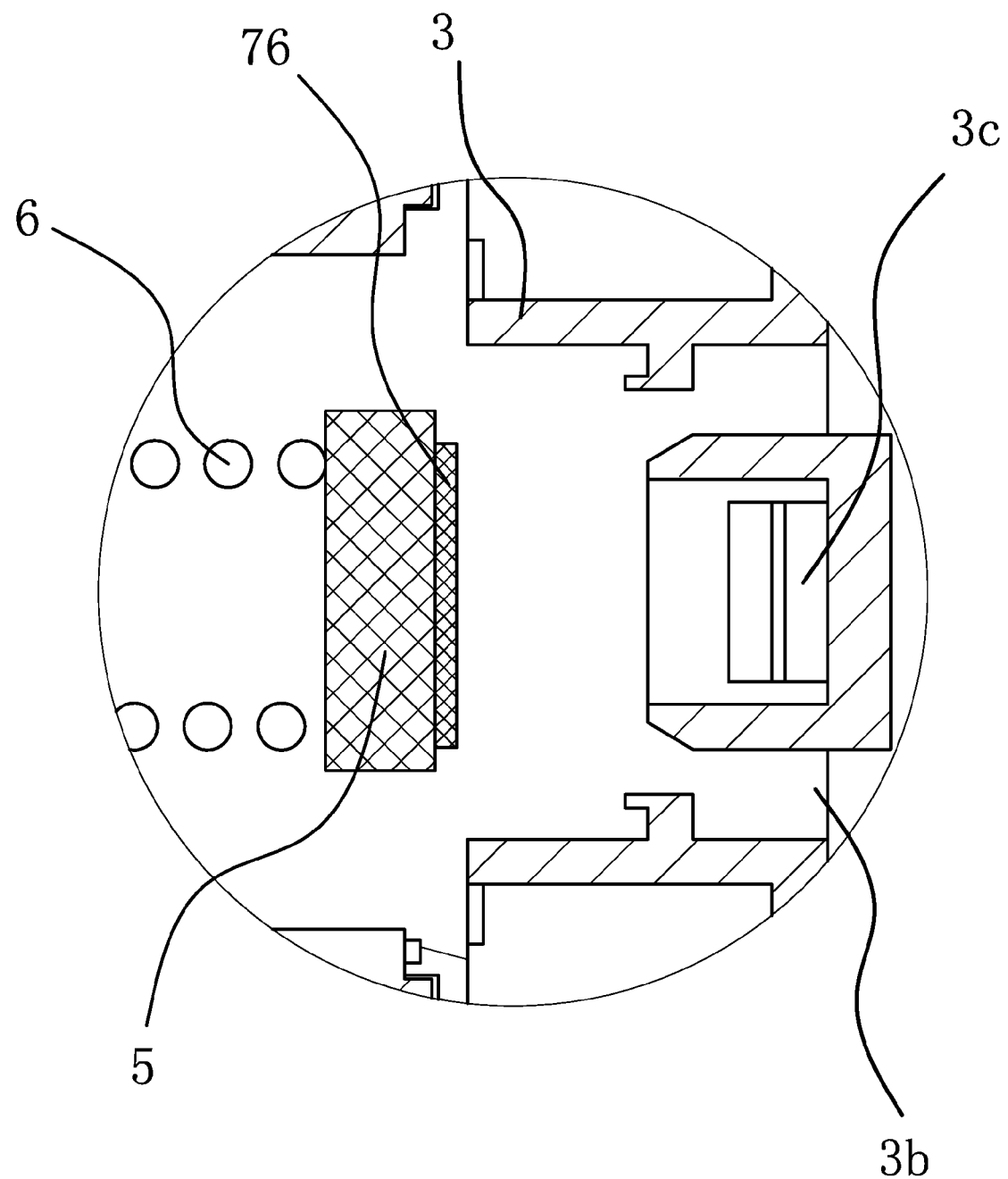
FIG. 9 is a schematic structural view of the sealing structure of a Third Embodiment of the present combined shower.

As shown in FIG. 7, this Third Embodiment is roughly the same as the technical proposal in First Embodiment. The differences are:

The sealing structure comprises a sheet-like sealing piece (76). The sealing piece (76) is fixed on the rear side of the first magnetic piece (5), and the sealing piece (76), along with the first magnetic piece (5) can tightly press against the end of the water passage port (3*d*) and forms a seal, under the action of the elastic force from the elastic piece (6).

The description of the preferred embodiments thereof serves only as an illustration of the spirit of the invention. It will be understood by those skilled in the art that various changes or supplements in form and details may be made therein without departing from the spirit and scope of the invention as defined by the appended claims.

LIST OF REFERENCE NUMERALS

1 Top Shower Head
1a Gap
1b Limit Block
1c First Outlet Chamber
2 Handheld Shower Head
2a Head Part
2b Handle Part
2c Second Outlet Chamber
2d Assembly Mount
3 Assembly Hub
3a Water Inlet
3b Water Inlet Cavity
3c Water Outlet Cavity
3d Water Passage Port
4 Water Hose
5 First Magnetic Piece
5a Sealing Part
6 Elastic Piece
71 Pressure Control Cavity
72 Flow Passage Cavity
73 Pressure Release Cylinder
73a Pressure Release Hole
74 Flow Passage Hole
75 Swinging Plate
76 Sealing Piece
77 Sealing Washer
77a Through Hole
8 Holder Cavity
9 Second Magnetic Piece
10 Support Bracket
10a Water Outlet
11 Shell
11a Cavity
11b Mounting Seat
11b1 Plug
12 Magnet Seat
13 Spool Seat
13a Slot
13b Pin
14 Valve Seat
14a Outflow Port
14b Vent
14c Hole
14d Connection Stud
14e Limiting Slot
15 Pressure Cap Connector
15a Connection Hole
16 Connection Fitting
17 Back Cap

What is claimed is:

1. A combined shower comprising:
an assembly hub (3) with a water inlet (3a);
a water inlet cavity (3b) and a water outlet cavity (3c) inside the assembly hub (3), the water inlet (3a) connected to the water inlet cavity (3b), the water inlet cavity (3b) connected to the water outlet cavity (3c) through a water passage port (3d);
a top shower head (1) connected to the water outlet cavity (3c);
a handheld shower head (2), the handheld shower head (2) having an outflow cavity (2c) connected to the water inlet cavity (3b) through a water hose (4);
a sealing structure inside the assembly hub (3), the sealing structure capable of connecting or blocking the top shower head (1) and the water inlet cavity (3b) by opening or closing the water passage port (3d) which faces a forward direction;
a pair of magnetic pieces comprising a first magnetic piece (5) inside the assembly hub (3) and a second magnetic piece (9) fixed in the outflow cavity (2c) of the handheld shower head (2); and
an elastic piece (6) inside the assembly hub (3), the elastic piece (6) capable of pushing the first magnetic piece (5) to move towards the sealing structure;
wherein the sealing structure comprises a pressure control cavity (71) located in a front area of the water passage port (3d) and a sealing washer (77) capable of moving back to press against an end of the water passage port (3d) and capable of moving away from the end of the water passage port (3d) under an action of water pressure from a front side and a rear side, the sealing washer (77) is arranged between the water outlet cavity (3c) and the pressure control cavity (71), a through hole (77a) on the sealing washer (77) connects the water inlet cavity (3b) to the pressure control cavity (71) and a pressure release passage connects the pressure control cavity (71) to the water outlet cavity (3c), a minimum cross-sectional area of the pressure release passage is greater than a minimum cross-sectional area of the through hole (77a), and the first magnetic piece (5) blocks the pressure release passage under an action of an elastic force from the elastic piece (6); and
wherein the second magnetic piece (9) is arranged magnetically opposite and facing the first magnetic piece (5), and under an action of an attraction force from the second magnetic piece (9), a head of the handheld shower head (2) is fixed on the assembly hub (3), the first magnetic piece (5) overcomes the elastic force from the elastic piece (6), and the first magnetic piece (5) moves in an opposite direction to cause the sealing structure to connect the outflow cavity (1c) of the top shower head (1) to the water inlet cavity (3b).

2. The combined shower as claimed in claim 1 wherein the sealing structure also comprises a flow passage cavity (72) located in front of the pressure control cavity (71), and a cylindrical pressure release cylinder (73); wherein the pressure release cylinder (73) is arranged along a front direction and a back direction; wherein a rear end of the pressure release cylinder (73) enters into the water outlet cavity (3c), and a front end of the pressure release cylinder (73) passes through the pressure control cavity (71) and connects to the flow passage cavity (72); wherein the sealing washer (77) is sleeved over an outside of the pressure release cylinder (73) and is capable of moving back and forth, along the pressure release cylinder (73); wherein the sealing washer (77) tightly presses against the pressure release cylinder (73) and forms a seal; wherein the pressure release passage comprises a flow passage hole (74) that is capable of connecting the pressure control cavity (71) to the flow passage cavity (72), and a pressure release hole (73a) that is located inside the pressure release cylinder (73) and connects the flow passage cavity (72) to the water outlet cavity (3c); wherein a hole diameter of the flow passage hole (74) and a hole diameter of the pressure release hole (73a) are each greater than a hole diameter of the through hole (77a); wherein the first magnetic piece (5) is arranged inside the flow passage cavity (72); and wherein the first magnetic piece (5) is capable of pressing against the front end of the pressure release cylinder (73) under the action of the elastic force from the elastic piece (6), and forms a seal.

3. The combined shower as claimed in claim 2 wherein a sealing part (5a) made of rubber material is fixed to a rear of the first magnetic piece (5), where the sealing part (5a) faces the pressure release hole (73a).

4. The combined shower as claimed in claim 1 wherein the elastic piece (6) is a spring and two ends of the spring press against an inner wall of the assembly hub (3) and an inner wall of the first magnetic piece (5), respectively.

5. The combined shower as claimed in claim 2 wherein the top shower head (1) is of an arc shape and a gap (1a) is located in a lower part;
wherein the assembly hub (3) is arranged at a rear side of the top shower head (1), and connects to the top shower head (1) by a support bracket (10);
wherein a middle part of the top shower head (1) forms a holder cavity (8) for a placement of the handheld shower head (2); and
wherein the gap (1a) allows a handle part (2b) of the handheld shower head (2) to pass through it.

6. The combined shower as claimed in claim 5 wherein projecting limit blocks (1b) are fixed on two sides of the top shower head (1), which are adjacent to the gap (1a); and
wherein rear ends of the limit blocks (1b) are capable of pressing against a front end of the handheld shower head (2) inside the holder cavity (8).

7. The combined shower as claimed in claim 3 wherein the assembly hub (3) includes a cylindrical shell (11) having a cavity (11a) therein, a mounting seat (11b), a disc-shaped magnet seat (12) and a spool seat (13), an annular valve seat (14), and a cylindrical pressure cap connector (15) is provided inside the cavity (11a) coaxially with the shell (11) and from a front of the shell (11) to a back of the shell (11); and
wherein the mounting seat (11b), the spool seat (13), the valve seat (14) and the cylindrical pressure cap connector (15) are plugged together, both the magnet seat (12) and the elastic piece (6) are arranged in the mounting seat (11b), at a rear of the pressure cap connector (15) is provided with a connection fitting (16) for water inflow and a back cap (17) for joining the connection fitting (16) to the pressure cap connector (15).

8. The combined shower as claimed in claim 7 wherein a rear end of the mounting seat (11b) is provided with an annular plug (11b1), the spool seat (13) has an annular slot (13a) at a front end of the spool seat (13), the plug (11b1) is inserted into the slot (13a), a rear end of the spool seat (13) has several protruding cylindrical pins (13b), the valve seat (14) is provided with several holes (14c) at a front end of the valve seat (14), the matching pins (13b) are inserted into the holes (14c), an edge of the sealing washer (77) is pressed in between the spool seat (13) and the valve seat (14), a rear end of the valve seat (14) also has protruding columnar connection studs (14d), a front end of the pressure cap connector (15) has concave connection holes (15a), the connection studs (14d) correspondingly insert into the connection holes (15a), a limiting slot (14e) for circumferentially limiting the valve seat (14) is also provided in an axial direction on a side of the valve seat (14), the pressure cap connector (15) has an external thread at a rear end of the pressure cap connector (15), a front end of the back cap has an internal thread and has a threaded connection with the pressure cap connector (15), a front end of the connection fitting is located inside the pressure cap connector (15) and the back cap (17), and a back end of the connection fitting extends backwards from a middle of the back cap (17) and is the water inlet (3a).

9. The combined shower as claimed in claim 8 wherein the first magnetic piece (5) is fixed inside the magnet seat (12), a center of a rear side of the first magnetic piece (5) is connected with two block-shaped sealing parts (5a) made of a rubber material, the two sealing parts (5a), with a larger one in a front and a smaller one in a rear, are superposed into a step shape.

10. The combined shower as claimed in claim 9 wherein a rear side of the spool seat (13) is recessed forward to form the pressure control cavity (71), the sealing washer (77) is made of a rubber material and the sealing washer (77) is provided at an opening of the pressure control cavity (71), the sealing washer (77) can be deformed to a front or to a back by an action of hydraulic pressure.

11. The combined shower as claimed in claim 10 wherein the valve seat (14) has a flat outflow port (14a), and the outflow port (14a) has the water outlet cavity (3c), the water passage port (3d) is provided on a front side of the outflow port (14a) and is opposed to the sealing washer (77), a part of the water inlet cavity (3b) is formed between two sides of the outflow port (14a) and an inner wall of the valve seat (14);
wherein the water outlet cavity (3c) is communicated with the first outlet chamber (1c) of the top shower head (1) through the water outlet (10a); and
wherein two ends of the outflow port (14a) extending to a side wall of the valve seat (14) and communicating with the water outlet (10a) through a vent (14b) punctured through the side wall of the valve seat (14).

12. The combined shower as claimed in claim 3 wherein the top shower head (1) is of an arc shape and a gap (1a) is located in a lower part;
wherein the assembly hub (3) is arranged at a rear side of the top shower head (1), and connects to the top shower head (1) by a support bracket (10);
wherein a middle part of the top shower head (1) forms a holder cavity (8) for a placement of the handheld shower head (2); and
wherein the gap (1a) allows a handle part (2b) of the handheld shower head (2) to pass through it.

13. The combined shower as claimed in claim 1 wherein the assembly hub (3) includes a cylindrical shell (11) having a cavity (11a) therein, a mounting seat (11b), a disc-shaped magnet seat (12) and a spool seat (13), an annular valve seat (14), and the cylindrical pressure cap connector (15) is provided inside the cavity (11a) coaxially with the shell (11) and from a front of the shell (11) to a back of the shell (11); and
wherein the mounting seat (11b), the spool seat (13), the valve seat (14), and the cylindrical pressure cap connector (15) are plugged together, both the magnet seat (12) and the elastic piece (6) are arranged in the mounting seat (11b), at a rear of the pressure cap connector (15) is provided with a connection fitting (16) for water inflow and a back cap (17) for joining the connection fitting (16) to the pressure cap connector (15).

14. The combined shower as claimed in claim 13 wherein a rear end of the mounting seat (11b) is provided with an annular plug (11b1), the spool seat (13) has an annular slot (13a) at a front end of the spool seat (13), the plug (11b1) is inserted into the slot (13a), a rear end of the spool seat (13) has several protruding cylindrical pins (13b), the valve seat (14) is provided with several holes (14c) at a front end of the valve seat (14), the matching pins (13b) are inserted into the holes (14c), an edge of the sealing washer (77) is pressed in between the spool seat (13) and the valve seat (14), a rear end of the valve seat (14) also has protruding columnar connection studs (14d), a front end of the pressure cap connector (15) has concave connection holes (15a), the connection studs (14d) correspondingly insert into the connection holes (15a), a limiting slot (14e) for circumferentially limiting the valve seat (14) is also provided in an axial direction on a side of the valve seat (14), the pressure cap connector (15) has an external thread at a rear end of the pressure cap connector (15), a front end of the back cap has an internal thread and has a threaded connection with the pressure cap connector (15), a front end of the connection fitting is located inside the pressure cap connector (15) and the back cap (17) and a back end of the connection fitting extends backwards from a middle of the back cap (17) and is the water inlet (3a).

* * * * *